(12) United States Patent
Stoesz et al.

(10) Patent No.: US 8,668,229 B2
(45) Date of Patent: Mar. 11, 2014

(54) CONTAMINATION RESISTANT CONNECTING SYSTEM AND METHOD

(75) Inventors: Carl W. Stoesz, Christianburg, VA (US); Luis E. Mendez, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 451 days.

(21) Appl. No.: 12/956,360

(22) Filed: Nov. 30, 2010

(65) Prior Publication Data
US 2012/0133123 A1 May 31, 2012

(51) Int. Cl.
*F16L 37/00* (2006.01)

(52) U.S. Cl.
USPC ............... 285/3; 285/2; 285/351; 285/352

(58) Field of Classification Search
USPC ............... 285/3, 382.2, 2–4, 351–352, 901; 137/614.04; 604/241, 249, 256, 533, 604/905
See application file for complete search history.

(56) References Cited

U.S. PATENT DOCUMENTS

| | | | | |
|---|---|---|---|---|
| 3,391,951 | A * | 7/1968 | Miller | 285/3 |
| 3,466,065 | A * | 9/1969 | Acker et al. | 285/3 |
| 3,476,411 | A * | 11/1969 | Herbert et al. | 285/192 |
| 4,019,512 | A * | 4/1977 | Tenczar | 604/411 |
| 4,022,205 | A * | 5/1977 | Tenczar | 604/411 |
| 4,030,494 | A * | 6/1977 | Tenczar | 604/411 |
| 4,610,469 | A * | 9/1986 | Wolff-Mooij | 285/260 |
| 4,951,326 | A * | 8/1990 | Barnes et al. | 4/494 |
| 5,810,398 | A * | 9/1998 | Matkovich | 285/3 |
| 5,838,857 | A | 11/1998 | Niekrasz | |
| 6,394,837 | B1 | 5/2002 | Edwards et al. | |
| 7,252,308 | B2 * | 8/2007 | Thilly | 285/3 |
| 7,273,389 | B2 | 9/2007 | Hoppach et al. | |
| 7,396,051 | B2 * | 7/2008 | Baldwin et al. | 285/354 |
| 2004/0256127 | A1 | 12/2004 | Brenner et al. | |
| 2005/0191899 | A1 | 9/2005 | Solano | |
| 2006/0157971 | A1 * | 7/2006 | Baldwin et al. | 285/3 |

OTHER PUBLICATIONS

G. McKay et al., "Advanced Sand Control Completion With Permanent Monitoring"; Society of Petroleum Engineers, SPE Paper No. 62954; Oct. 1, 2000.
John C. Patterson et al., "First 4.5-in Through-Tubing ESP with Downhole Wet Connect"; Society of Petroleum Engineers, SPE Paper No. 123996; Oct. 4, 2009.
Notification of Transmittal of the International Search Report and the Written Opinion of the International Searching Authority; PCT/US2011/062414; Mailed Apr. 27, 2012; Korean Intellectual Property Office; 9 pages.

* cited by examiner

*Primary Examiner* — Aaron Dunwoody
*Assistant Examiner* — Fannie Kee
(74) *Attorney, Agent, or Firm* — Cantor Colburn LLP

(57) ABSTRACT

A contamination resistant connecting system includes, a first conduit, a first connector in operable communication with the first conduit, a first seal configured to seal at least part of the first connector from an environment, a second conduit operationally connectable with the first conduit, a second connector in operable communication with the second conduit that is operationally connectable with the first connector and a second seal configured to seal at least part of the second connector from an environment. Additionally, at least one piercing device is configured to pierce through the first seal and the second seal to allow operational connection of the first conduit with the second conduit.

15 Claims, 6 Drawing Sheets

CONTAMINATION RESISTANT CONNECTING SYSTEM AND METHOD

BACKGROUND

Making reliable connections between conduits, such as, optical fiber, electrical wiring and hydraulic lines in a contaminated environment, such as downhole in an earth formation borehole in the drilling and completion industries, for example, can be challenging. Contamination positioned between mating surfaces of the conduits after connections are made can negatively affect any signals that are transported between the connected conduits. Systems and methods to alleviate this concern are of interest to those practicing in the art.

BRIEF DESCRIPTION

Disclosed herein is a contamination resistant connecting system. The system includes, a first conduit, a first connector in operable communication with the first conduit, a first seal configured to seal at least part of the first connector from an environment, a second conduit operationally connectable with the first conduit, a second connector in operable communication with the second conduit that is operationally connectable with the first connector and a second seal configured to seal at least part of the second connector from an environment. Additionally, at least one piercing device is configured to pierce through the first seal and the second seal to allow operational connection of the first conduit with the second conduit.

Further disclosed herein is a method of contamination resistantly connecting connectors. The method includes, aligning a first connector with a second connector, butting a first seal of the first connector with a second seal of the second connector, piercing the first seal and the second seal, and operationally connecting a first conduit of the first connector with a second conduit of the second connector.

Further disclosed herein is a contamination resistant connecting system. The system includes, a first control line having a first end sealed from an environment in part by a first seal, a second control line that is operationally connectable with the first control line having a second end sealed from an environment in part by a second seal. At least one of the first seal and the second seal is deformable in response to pressing against one another, and at least one piercing device is configured to pierce through the first seal and the second seal to facilitate operational communication between the first control line and the second control line.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
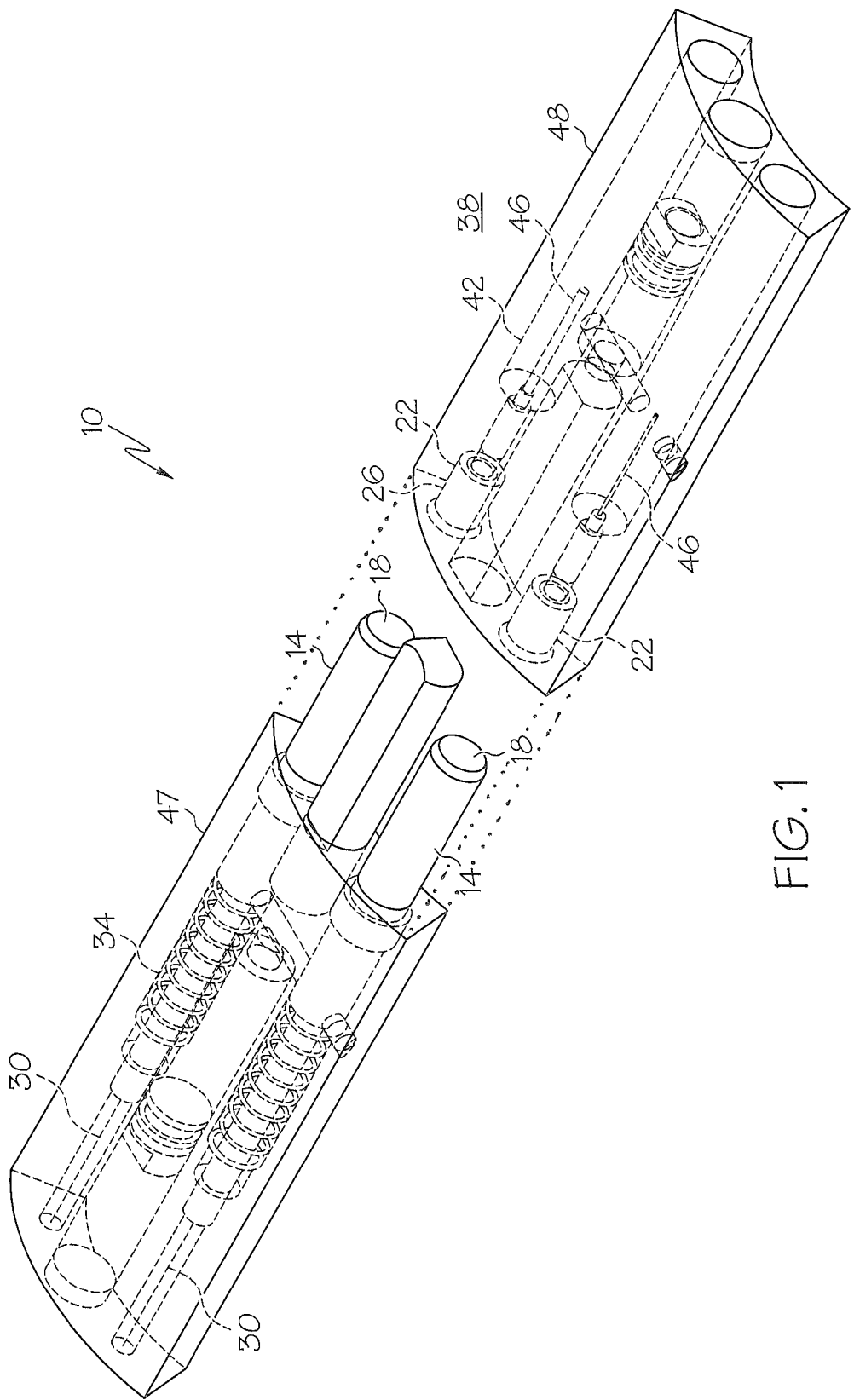
FIG. 1 depicts a partially transparent perspective view of a portion of a contamination resistant connecting system disclosed herein in an unconnected position.
Figure 2:
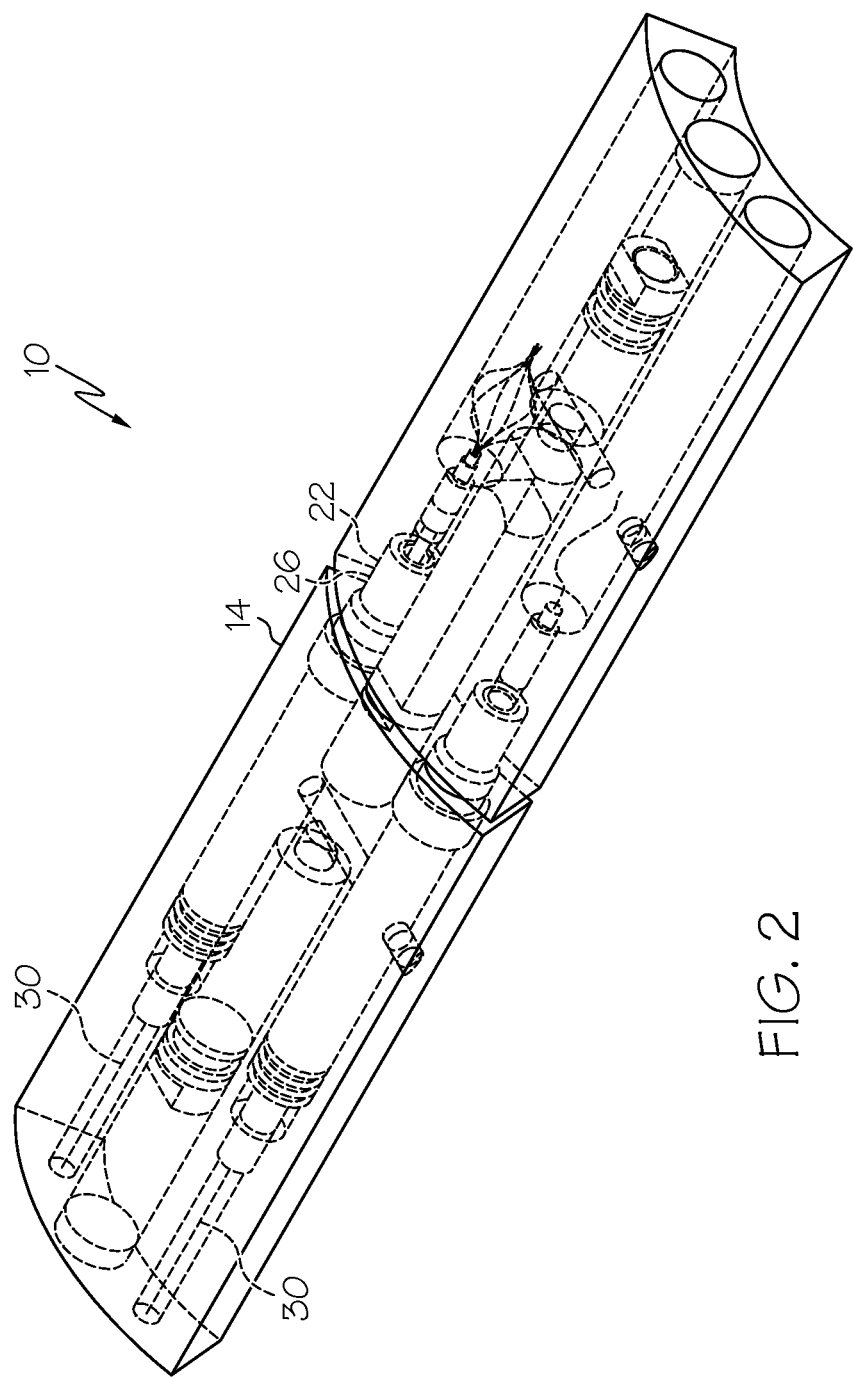
FIG. 2 depicts a partially transparent perspective view of a portion of the contamination resistant connecting system of FIG. 1 in a fully connected position.

Referring to FIGS. 1 and 2, an embodiment of a contamination resistant connecting system disclosed herein is illustrated at 10. The connecting system 10 includes, a first connector 14 having a first seal 18 that is connectable with a second connector 22 having a second seal 26. The first seal 18 seals an environment 38 from a cavity 34 within which is housed a first conduit 30. Similarly, the second seal 26 seals the environment 38 from a cavity 42 within which is housed a second conduit 46. The conduits 30, 46 in this embodiment are fiber optical cables, however, other embodiments using electrical wire, such as those used for control lines in downhole completions, are also contemplated, as well as hydraulic lines. A piercing device 50 (see FIGS. 5 and 6), shown in this embodiment as a hollow non-coring needle, similar to a hypodermic needle, for example, is also housed within the cavity 34. The piercing device 50 is configured to pierce through the seals 18, 26 and allow the first conduit 30 to connect with the second conduit 46 so that signals and power or combinations thereof can be transported therethrough and between the two conduits 30, 46.

In FIG. 1 the connectors 14 and 22 are shown aligned while the seals 18 and 26 are still separated by a space such that they are short of making contact with one another. Whereas in FIG. 2 the connectors 14 and 22 are fully connected to one another.

In the embodiment of FIGS. 1 and 2 the connectors 14 and 22 are sealingly engaged with bodies 47 and 48 respectively that in this embodiment are illustrated as tubulars. Bodies 47 and 48 are portions of a tool string deployable within a borehole in an earth formation in, for example, the hydrocarbon or carbon sequestration industries. The bodies 47, 48 are configured to maintain sealing engagement with the respective connectors 14, 22 while being positioned in a downhole environment at high temperatures and high pressures.

Figure 3:
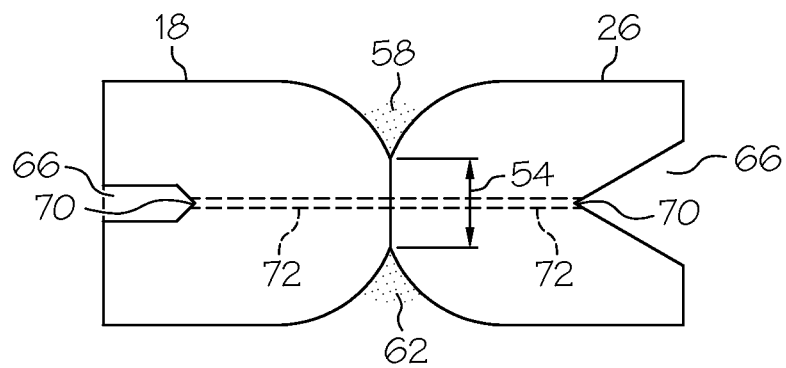
FIG. 3 depicts seals of the contamination resistant connecting system of FIG. 1 in a partially engaged position.
Figure 4:
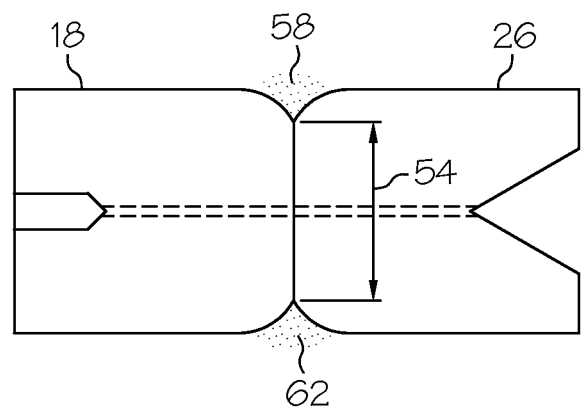
FIG. 4 depicts the seals of FIG. 3 in a more fully engaged position.

Referring to FIGS. 3 and 4, only the seals 18 and 26 are illustrated with each Figure showing a position having a different amount of engagement. In this embodiment the seals 18, 26 are made of an easily deformable material such as an elastomer. In FIG. 3 the seals 18, 26 are in contact with a small longitudinal load being applied therethrough. As such, a contact area, illustrated by dimension 54, is relatively small. As longitudinal loading between the seals 18, 26 increase the contact area, and thus dimension 54, increases. As the seals 18, 26 are urged toward one another and the dimension 54 is increased fluid 58 and contamination 62 positioned between the seals 18, 26 is expelled in the process, thereby decreasing the potential for contamination to intercede between the conduits 30, 46 when they are mated together. The seals 18, 26 may include indentations 66 with conical apexes 70 to help center the conduits 30, 46 and/or the piercing device 50 prior to piercing of the seals 18, 26. Optional embodiments of the seals 18, 26 may include boreholes 72, or slits (shown in FIG. 3 only with dashed lines) therein that remain sealably closed to fluid transport until the piercing device 50 is pierced therethrough.

Figure 5:
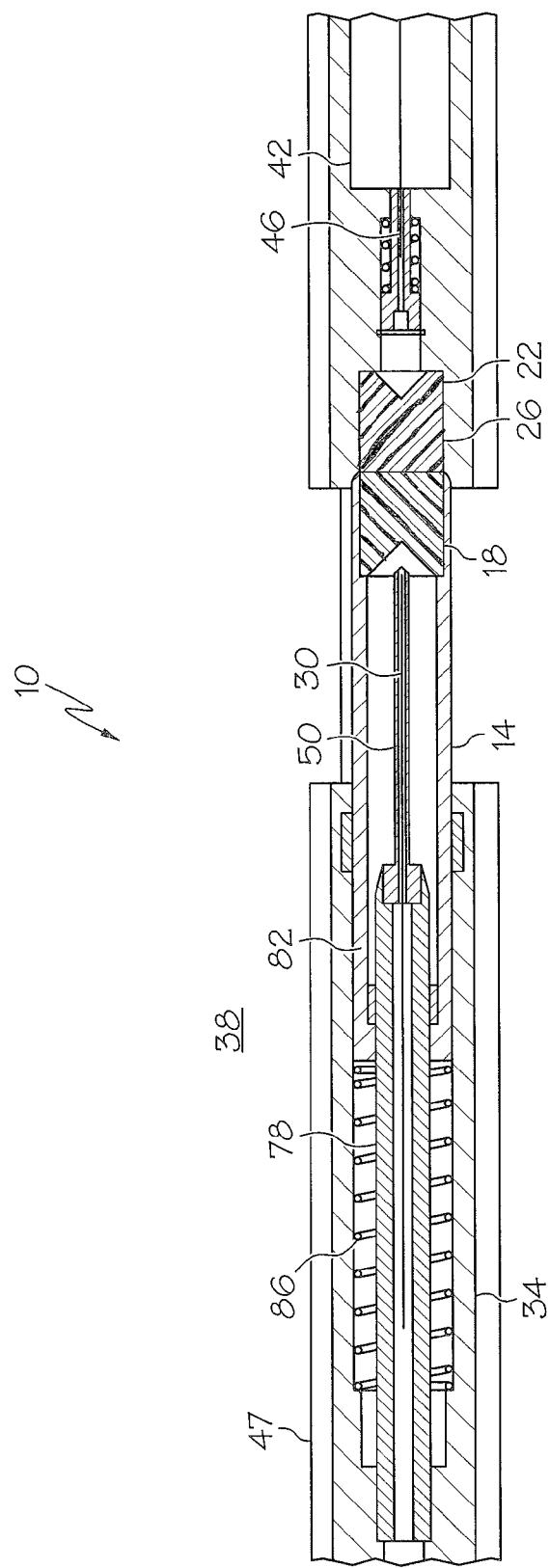
FIG. 5 depicts a cross sectional view of the contamination resistant connecting system of FIG. 1, in a partially engaged position.

Referring to FIG. 5, a cross sectional view of the connecting system 10 is illustrated in a position wherein the seals 18, 26 are compressed against one another but have not yet been pierced by the piercing device 50. The piercing device 50 is fixedly mounted to the body 47 of the connector 14 by a mandrel 78. A tubular 82 of the connector 14 is slidably engaged between the body 47 and the mandrel 78 and is biased with a biasing member 86 illustrated herein as a compression spring. As the connectors 14 and 22 are urged toward one another, the tubular 82 is moved deeper into the body 47 (leftward in the Figure) compressing the biasing member 86 in the process. As this movement continues the piercing device 50 pierces through the seals 18 and 26. Since the seals 18, 26 are sealed to each other by the compression therebetween the cavities 34, 42 remain isolated from the environment 38 during piercing and after the piercing device 50 has pierced through both of the seals 18, 26.

Figure 6:
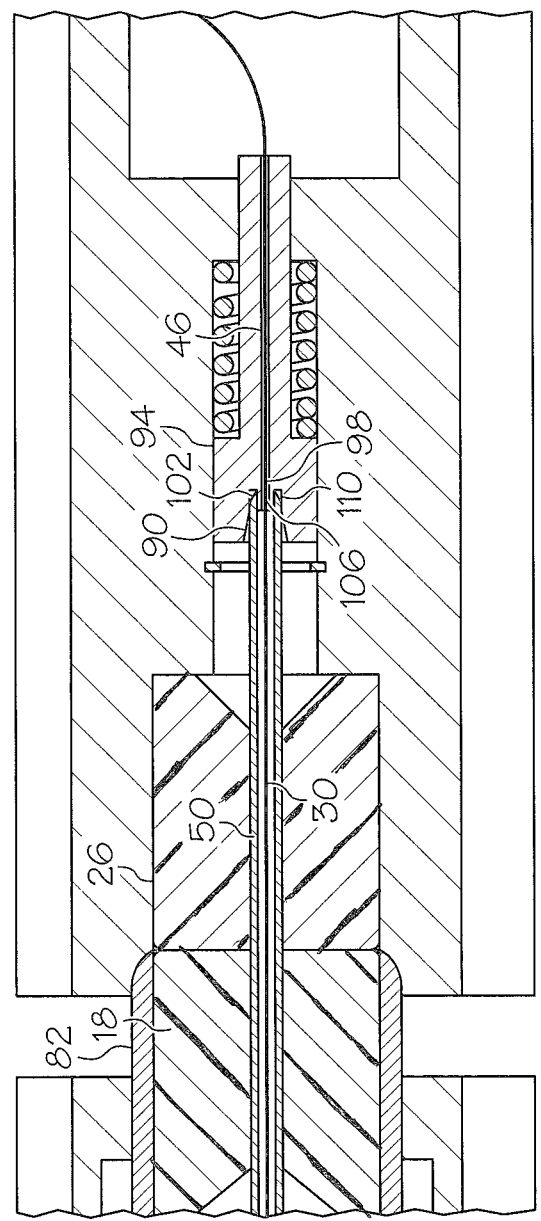
FIG. 6 depicts a magnified view of the cross sectional view of FIG. 5 in a fully engaged position.

Referring to FIG. 6, the piercing device 50 is shown pierced through the seals 18, 26 in this magnified sectioned view. Having pierced through the seals 18, 26 the piercing device 50 is guided by a conical pilot 90 in a receiver 94 of the connector 22. The second conduit 46 is attached to the receiver 94 so that an end 98 of the second conduit 46 is a fixed distance from a land 102 within the receiver 94. Similarly, an end 106 of the first conduit 30 is set a fixed distance from an end 110 of the piercing device 50. These fixed dimensions are selected so that the ends 98, 110 butt up against one another in the case where the conduits 30, 46 are fiber optic cables, for example, to assure optical signals may be efficiently transported between the two conduits 30, 46. In embodiments wherein the conduits are electrical wire, for example, methods of frictionally engaging and mating the two conduits 30, 46 to one another can be employed.

Figure 7:
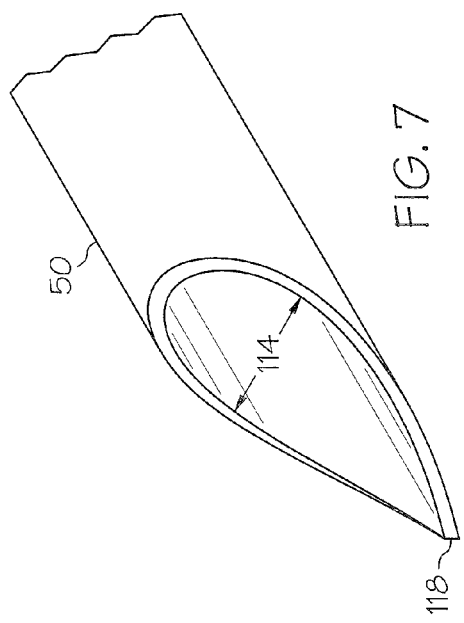
FIG. 7 depicts a magnified view of an end of a piercing device incorporated in the contamination resistant connecting system of FIG. 1.

Referring to FIG. 7, the end of the piercing device 50 is illustrated in a magnified view. The piercing device 50 is hollow with an inside dimension 114 that allows at least the first conduit 30 to pass therethrough as is illustrated in FIG. 6. The piercing device 50 has a point 118 to facilitate piercing of the seals 18, 26. Additionally, the shape of the end is similar to a hypodermic needle so that it pierces through the seals 18, 26 without removing a core of seal material. In other embodiments the piercing device 50 could simply be the conduit 30 itself.

Figure 8:
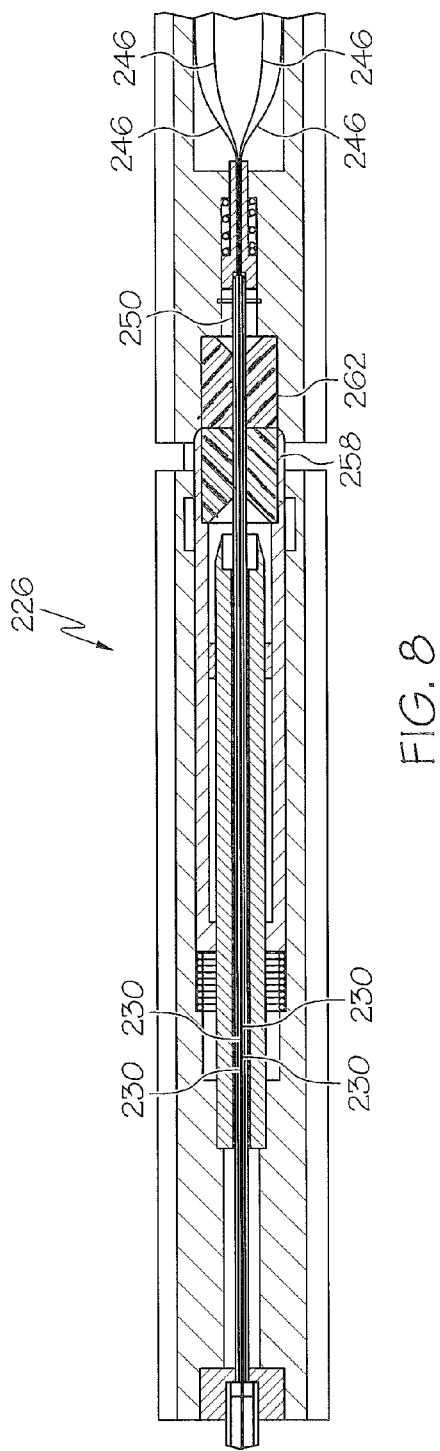
FIG. 8 depicts a cross sectional view of a contamination resistant connecting system disclosed herein with a plurality of connectable conduits.

Referring to FIG. 8, in an alternate embodiment of a contamination resistant connecting system illustrated at 226 a plurality of first conduits 230 are connectable with a plurality of second conduits 246. The connecting system 226 works in much the same manner as the connecting system 10, with a primary difference being a piercing device 250 employed therein pierces a plurality of holes through seals 258, 262 to accommodate the plurality of first conduits 230.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed:

1. A contamination resistant connecting system, comprising:
    a first conduit;
    a first connector in operable communication with the first conduit;
    a second conduit operationally connectable with the first conduit;
    a first seal, configured to seal at least part of the first connector from an environment, having a preexisting borehole or slit therein that remains sealably closed to fluid transport prior to connection between the first conduit and the second conduit;
    a second connector in operable communication with the second conduit being operationally connectable with the first connector;
    a second seat, configured to seal at least part of the second connector from an environment, having a preexisting borehole or slit therein that remains sealably closed to fluid transport prior to connection between the first conduit and the second conduit; and
    at least one piercing device configured to pierce through the preexisting borehole or slit of the first seal and the second seal to allow operational connection of the first conduit with the second conduit.

2. The contamination resistant connecting system of claim 1, wherein the at least one piercing device includes at least one needle having a bore therethrough receptive to at least one of the first conduit and the second conduit.

3. The contamination resistant connecting system of claim 2, wherein the at least one needle has a non-coring configuration.

4. The contamination resistant connecting system of claim 1, wherein the first conduit and the second conduit are control lines.

5. The contamination resistant connecting system of claim 1, wherein the first conduit and the second conduit are selected from the group consisting of optical fiber, electrical wire and hydraulic lines.

6. The contamination resistant connecting system of claim 1, wherein the at least one piercing device is at least one of the first conduit and the second conduit.

7. The contamination resistant connecting system of claim 1, wherein at least one of the first seal and the second seal is flexible.

8. The contamination resistant connecting system of claim 1, wherein at least one of the first seal and the second seal is deformable in response to being pressed against the other.

9. The contamination resistant connecting system of claim 1, wherein at least one of the first seal and the second seal is elastomeric.

10. The contamination resistant connecting system of claim 1, wherein a contact area between the first seal and the second seal starts small and grows as the first connector and the second connector are brought into connecting engagement with one another.

11. The contamination resistant connecting system of claim 10, wherein growth of the contact area between the first seal and the second seal causes fluid to be expelled expelling contamination therewith.

12. The contamination resistant connecting system of claim 10, wherein a shape of at least one of the first seal and the second seal facilitates the growth of the contact area.

13. The contamination resistant connecting system of claim 1, wherein pressure differential across at least one of the first seal and the second seal is maintained at a low level.

14. The contamination resistant connecting system of claim 1, further comprising a tubular configured to sealingly engage the connector while positioned within a borehole in an earth formation.

15. A contamination resistant connecting system, comprising:
- a first control line having a first end sealed from an environment in part by a first seal having a preexisting borehole or slit;
- a second control line being operationally connectable with the first control line having a second end sealed from an environment in part by a second seal having a preexisting borehole or slit therein, the preexisting boreholes or slits in the first seal and the second seal remaining sealably closed to fluid transport prior to connection between the first control line and the second control line, at least one of the first seal and the second seal being deformable in response to being urged against one another; and
- at least one piercing device configured to pierce through the borehole or slit of first seal and the second seal to facilitate operational communication between the first control line and the second control line.

\* \* \* \* \*